3,335,179
PRODUCTION OF ACETIC ACID AND RECOVERY
BY PLURAL STAGE DISTILLATION
Harold R. Null, Florissant, Leon E. Bowe, Glendale, and Robert C. Binning, St. Louis, Mo., assignors to Monsanto Company, a corporation of Delaware
Filed Feb. 12, 1964, Ser. No. 344,246
5 Claims. (Cl. 260—533)

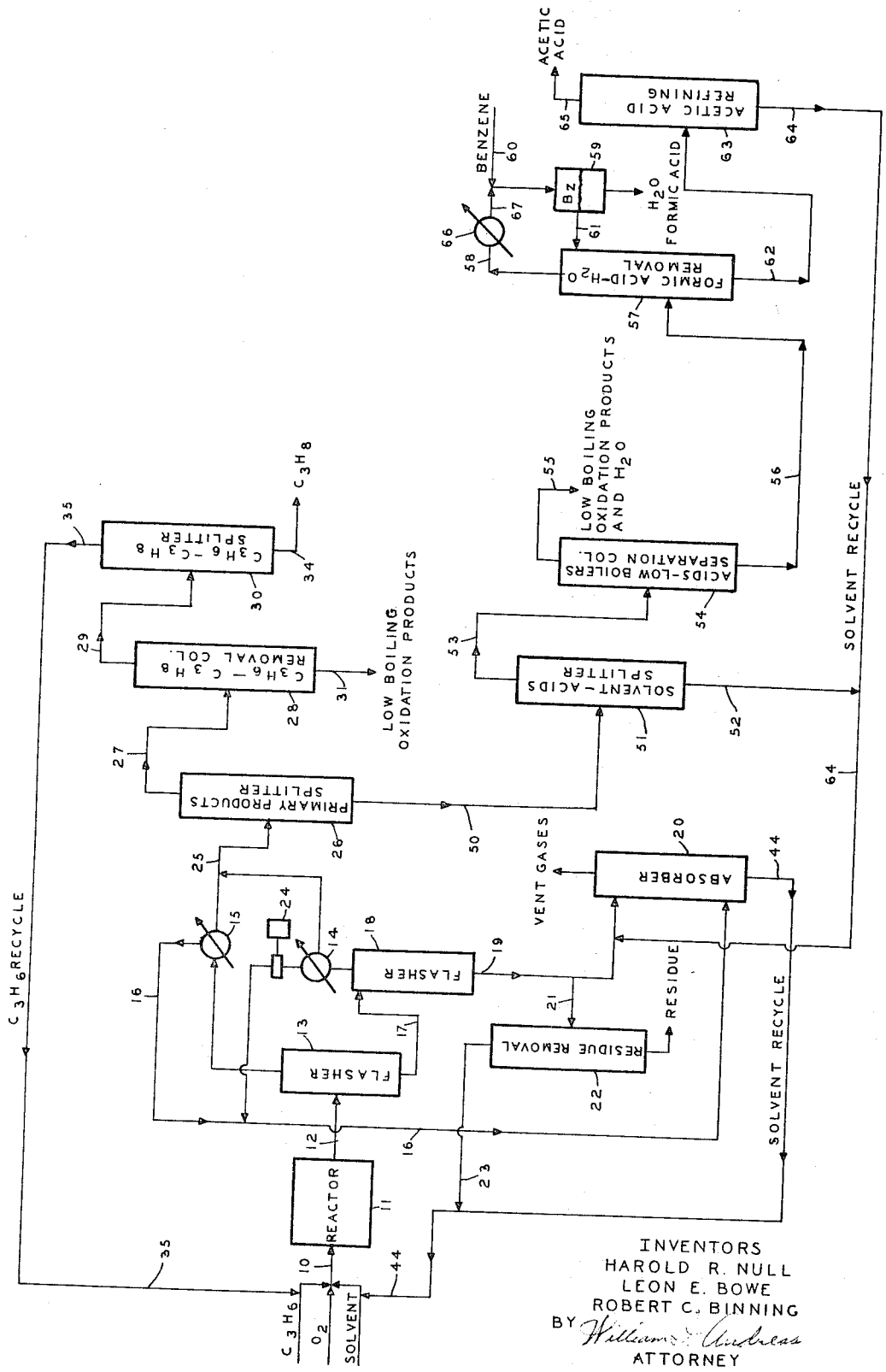

The present invention relates to the production and recovery of acetic acid.

In broad aspect the present invention relates to the oxidation of propylene with molecular oxygen to produce acetic acid.

One aspect of the present invention involves conducting the said oxidation in a liquid phase comprising fully esterified polyacyl esters of polyols more fully described hereinafter.

Another aspect of this invention concerns a novel recovery system for the product acetic acid.

Still another aspect of this invention relates to a non-catalytic olefin oxidation system to produce and recover acetic acid.

There are numerous methods described in the prior art for producing and recovering carboxylic acids. Illustrative prior art methods for producing such acids include various carbonylation procedures, notably the reaction of olefins with carbon monoxide and water. For example, in U.S. Patent 2,831,877 an olefin and carbon monoxide are reacted in an anhydrous medium in the presence of a catalyst such as concentrated sulfuric acid or anhydrous hydrogen fluoride or chlorosulfonic acid alone or with boron trifluoride. The reaction mixture is then hydrated to produce the resultant carboxylic acid. Variations of the above process include the use of different catalysts, e.g., monohydroxyfluoboric acid alone or mixed with phosphoric or sulfuric acids as in U.S. Patent 2,876,241 or solid phosphoric acid as described in U.S. Patent 3,036,124.

Another patent (U.S. Patent 2,913,489) describes the reaction of alcohols and/or ethers with carbon monoxide to produce carboxylic acids.

Still another prior art process (U.S. Patent 2,000,878) describes the reaction of propylene with an aqueous alkali metal hydroxide in water to produce alkali metal acetates which may be acidified with concentrated $H_2SO_4$ or HCl to recover acetic acid. This process utilizes temperatures in the range of from 300–420° C. and basic aluminum compounds as catalysts, e.g., aluminum oxide or hydroxide.

Other prior art methods rely upon the use of acetylene as a starting material to produce acetic acid. For example, in U.S. Patent 1,128,780, acetylene is reacted with a peroxidizing agent, e.g., hydrogen peroxide or persulfuric acid in the presence of mercury or a mercury compound. Another patent (U.S. Patent 1,174,250) describes a process for the reaction of acetylene, oxygen and water in the presence of a mercury compound, an organic acid such as acetic acid and an inorganic acid, e.g., phosphoric acid.

Other methods described in the prior art for producing acetic acid involve the oxidation of paraffins with molecular oxygen in a solvent such as carbon tetrachloride or benzene containing an oxidation catalyst and initiator (U.S. Patent 2,265,948). Another paraffin oxidation process describes a non-catalytic oxidation, but relies upon a critical ratio of throughput rates of oxygen, paraffin and a distillate fraction of reaction products boiling below 99° C. in the presence of water. (U.S. Patent 2,825,740).

Still other methods for producing acetic acid involve the oxidation of olefins with molecular oxygen in the presence of various catalysts. For example, in one process (U.S. Patent 3,057,915) ethylene is oxidized with oxygen in the presence of water vapor and a catalyst comprising a carrier, a salt of a noble metal, cupric chloride and an oxide of a metal such as iron, manganese and/or cobalt.

Most of the prior art processes heretofore described suffer one or more disadvantages in that they require oxidation catalysts, initiators, critical reactant feed rates, expensive or dangerous starting materials, unduly high reaction temperatures or difficult separation techniques.

It is, therefore, an object of the present invention to provide a liquid phase propylene oxidation process for the production of and recovery of acetic acid.

An object of this invention is to provide a non-catalytic direct oxidation of propylene with molecular oxygen to produce acetic acid in a liquid phase comprising fully esterified polyacyl esters of polyols.

Still another object of this invention is to provide a process for producing acetic acid which does not utilize expensive, unsafe or hard-to-obtain starting materials, is simple, economical and practical.

These and other objects of the invention will become more apparent as the description of the invention proceeds. A schematic flow diagram of the process is shown in the accompanying drawing.

The present invention comprises the production of acetic acid by the controlled direct oxidation of propylene with molecular oxygen in the liquid phase and to a novel means of separating and recovering this product.

The liquid phase in which the oxidation occurs comprises solvents which are essentially chemically indifferent, high boiling with respect to volatile oxidation products and are oxidatively and thermally stable under the condition of the reaction described. Further, the solvents employed in the present invention are highly resistant to attack by free radicals which are generated in the oxidation process. Moreover, the solvents employed in the instant invention are effective in assuaging the deleterious effects of acidic components, especially formic acid and to a lesser degree acetic acid, on commercially valuable non-acidic by-products, e.g., propylene oxide, which are formed in the oxidation of olefins.

Solvents primarily and preferably contemplated herein comprise fully esterified polyacyl esters of polyhydroxyalkanes, polyhydroxycycloalkanes, polyglycols and mixtures thereof. Polyacyl esters contemplated herein contain, generally, from 1 to 18 carbon atoms in each acyl moiety and from 2 to 18 carbon atoms in each alkylene or cycloalkylene moiety. However, best results obtain when the acyl moiety contains from 1 to 6 carbon atoms and the alkylene and cycloalkylene moiety each contains from 2 to 6 carbon atoms. These esters may be readily prepared by methods known to the art. For example, in U.S. Patent 1,534,752 is described a method whereby glycols are reacted with carboxylic acids to produce the corresponding glycol ester. Acid anhydrides may be used in place of the acids.

Representative glycols include straight-chain glycols, such as ethylene glycol, propylene glycol, butylene glycol, pentylene glycol, hexylene glycol, heptylene glycol, octylene glycol, nonylene glycol, decylene glycol, dodecylene glycol, pentadecylene glycol and octadecylene glycol. Branched-chain glycols such as the iso-, primary, secondary and tertiary isomers of the above straight chain glycols are likewise suitable, e.g., isobutylene glycol, primary, secondary, and tertiary amylene glycols, 2-methyl-2,4-pentanediol, 2-ethyl-1,3-hexanediol, 2,3-dimethyl-2,3-butanediol, 2-methyl-2,3-butanediol and 2,3-dimethyl-2,3-dodecanediol. Polyalkylene glycols (polyols) include diethylene glycol, dipropylene glycol, tripropylene glycol, tetrapropylene glycol and dihexylene glycol.

In addition to straight and branched-chain glycols, alicyclic glycols such as 1,2-cyclopentanediol, 1,2-cyclohexanediol, 1-methyl-1,2-cyclohexanediol and the like may be used.

Other suitable hydroxy compounds include polyhydroxy alkanes, such as glycerol, erythritol and pentaerythritol and the like.

Representative carboxylic acids include fatty acids such as formic acid, acetic acid, propionic acid, butyric acid, valeric acid, caproic acid, caprylic acid, lauric acid, palmitic acid, stearic acid, naphthenic acids, such as cyclopentane carboxylic acid, cyclohexane carboxylic acid, and aromatic acids such as benzoic acid and the like.

Representative polyacyl esters include polyacyl esters of polyhydroxy alkanes, such as triacyl esters of glycerol, e.g., glycerol triacetate; tetracyl esters of erythritol and pentaerythritol, e.g., erythritol tetraacetate and pentaerythritol tetraacetate and the like, and polyacyl esters of polyalkylene glycols (polyglycols), such as diethylene glycol diacetate, dipropylene glycol diacetate, tetraethylene glycol diacetate and the like. These polyacyl ester solvents may be used individually or as mixtures, being compatible with each other. For example, a mixture of varying proportions of a diacyl ester of a hydroxyalkane, such as propylene glycol diacetate, and a polyacyl ester of a polyglycol, such as dipropylene glycol diacetate, may be used. Or, a mixture of a polyacyl ester of a polyglycol, such as dibutylene glycol dibutyrate, and a polyacyl ester of a polyhydroxy alkane, such as glycerol trivalerate, or pentaerythritol tetrapropionate may be used as the solvent in the instant process illustrated in the examples below.

Of particular interest in the present process are the vicinal diacyl esters of alkylene glycols, such as the diformates, diacetates, diproprionates, dibutyrates, divalerates, dicaproates, dicaprylates, dilaurates, dipalmitates and distearates, and mixtures thereof, of the alkylene and polyalkylene glycols recited above. Still more particularly, of greater interest are the diacetates of ethylene and propylene glycols used individually or in admixtures of any proportion.

Polyacyl esters having mixed acyl groups are likewise suitable, e.g., ethylene glycol formate butyrate, propylene glycol acetate propionate, propylene glycol butyrate propionate, butylene glycol acetate caproate, diethylene glycol acetate butyrate, dipropylene glycol propionate caproate, tetraethylene glycol butyrate caprylate, erythritol diacetate dipropionate, pentaerythritol dibutyrate divalerate, glycerol dipropionate butyrate and cyclohexanediol acetate valerate.

Monoacyl esters of polyhydroxyalkanes and polyglycols are unsuitable for use as a reaction medium according to the present process. The same is true of other hydroxy or hydroxylated compounds such as glycerin, glycols, polyglycols and hydroxy carboxylic acids. This is due to the presence of an abundance of reactive hydroxyl groups which are susceptible to autooxidative attack, hence, introduce concomitant oxidation side reactions which compete with the desired direct oxidation of the olefin.

In the preferred mode of operation the polyacyl esters used herein constitute the major proportion of the liquid reaction medium with respect to all other constituents including reactants, oxidation products and by-products dissolved therein. By major is meant that enough solvent is always present to exceed the combined weight of all other constituents. However, it is within the purview of this invention, although a less preferred embodiment, to operate in such manner that the combined weight of all components in the liquid phase other than polyacyl esters exceed that of the polyacyl ester solvent. For example, a refinery grade hydrocarbon feedstock or a crude hydrocarbon feedstock containing, e.g., 50% by weight of the olefin to be oxidized, e.g., propylene, and 50% by weight of saturated hydrocarbons, e.g., an alkane such as propane, may be used in quantities up to 50% by weight based on the solvent. Upon oxidizing this feedstock, unreacted olefin, alkane and oxygen together with oxidation products including acetic acid, low boilers such as acetaldehyde, propylene oxide, acetone and methyl acetate, and high boilers (components having boiling points higher than that of the polyacyl ester solvent) formed in the reaction and/or recycled to the reactor may constitute as much as 75% by weight of the liquid reaction medium, according to reaction conditions or recycle conditions.

When carrying out the invention according to the less preferred mode of operation, the quantity of polyacyl ester solvent present in the liquid reaction medium should be not less than 25% by weight of said medium in order to advantageously utilize the aforementioned benefits characteristic to these unique olefin oxidation solvents.

In further embodiments of the present invention for producing acetic acid by oxidizing olefins with molecular oxygen in the liquid phase, the polyacyl ester solvents are suitably used in combination with diluents or auxiliary solvents which are high boiling with respect to volatile oxidation products, are relatively chemically indifferent and oxidatively and thermally stable under reaction conditions. Here, too, the polyacyl ester solvents should be utilized in quantities not less than 25% by weight of the liquid reaction medium in order to retain the superior benefits of these polyacyl ester solvents in the present liquid phase olefin oxidation.

Suitable diluents which may be utilized with the polyacyl ester solvents of this invention include, e.g., hydrocarbon solvents such as xylenes, kerosene, biphenyl and the like; halogenated benzenes such as chlorobenzenes, e.g., chlorobenzene and the like; dicarboxylic acid esters such as dialkyl phthalates, oxalates, malonates, succinates, adipates, sebacates, e.g., dibutyl phthalate, dimethyl succinate, dimethyl adipate, dimethyl sebacate, dimethyl oxalate, dimethyl malonate and the like; aromatic ethers such as diaryl ethers, e.g., diphenyl ether; halogenated aryl ethers such as 4,4'-dichlorodiphenyl ether and the like; diaryl sulfoxides, e.g., diphenyl sulfoxide; dialkyl and diaryl sulfones, e.g., dimethyl sulfone and dixylyl sulfone and nitroalkanes, e.g., nitrohexane. While the foregoing have been cited as typical diluents which may be used in combination with the polyacyl ester solvents in this invention, it is to be understood that these are not the only diluents which can be used. In fact, the benefits accruing from the use of these polyacyl esters can be utilized advantageously when substantially any relatively chemically indifferent diluent is combined therewith.

Therefore, the present invention in its broadest use comprehends the oxidation of olefin-containing feed-stocks in a liquid reaction medium consisting essentially of at least 25% by weight based on said medium of at least one fully esterified polyacyl ester described above.

In any case, the liquid reaction medium referred to herein is defined as that portion of the total reactor content which is in the liquid phase.

It is therefore apparent that the liquid reaction media contemplated herein possess not only those characteristics described in prior art solvents, viz., they are high boiling with respect to volatile oxidation products under the conditions of reaction, essentially chemically indifferent and oxidatively and thermally stable, but in addition, possess characteristics not described in prior art oxidations, viz., resistance to free radical attack, the ability to reduce and/or eliminate the deleterious effects of acidic components on valuable non-acidic by-products. In addition, due to the facile manner in which the present oxidation proceeds in the described solvents, no oxidation catalysts, promoters, initiators, buffers, neutralizers, polymerization inhibitors, etc. are required as in many prior art processes.

As noted above, no added catalysts are required in the present oxidation process. However, due to the versatility of the above-described solvents in olefin oxidations, the usual oxidation catalysts can be tolerated although usually no significant benefit accrues from their use. For example, metalliferous catalysts such as platinum, selenium, vanadium, iron, nickel, cobalt, cerium, chromium, manganese, silver, cadmium, mercury and their compounds, preferably in the oxide form, etc., may be present in gross form, supported or unsupported, or as finely divided suspensions.

In like manner, since the olefin oxidations according to this invention proceed at a rapid rate after a brief induction period, no initiators or promoters are required, but may be used to shorten or eliminate the brief induction period, after which no additional initiator or promoter need be added.

Suitable initiators include organic peroxides, such as benzoyl peroxide; inorganic peroxides, such as hydrogen and sodium peroxides; peracids, such as peracetic and perbenzoic acids; ketones, such as acetone; ethers, such as diethyl ether; and aldehydes, such as acetaldehyde, propionaldehyde and isobutyraldehyde.

Use of the solvents described herein, being free of the necessity to use various additives described in prior art processes, enhances the separation and recovery of acetic acid by the sequence of steps described in detail below.

In carrying out the process of the instant invention, the reaction mixture may be made up in a variety of ways. For example, the olefin and oxygen may be premixed with the solvent and introduced into the reactor, or the olefin may be premixed with the solvent (suitably, up to 50% by weight based on the solvent and, preferably, from 5 to 30% by weight based on the solvent). Preferably, the olefin is premixed with the solvent and the oxygen-containing gas introduced into the olefin-solvent mixture incrementally, or continuously, or the olefin and oxygen-containing gas may be introduced simultaneously through separate or common feedlines into a body of the solvent in a suitable reaction vessel (described below). In one embodiment an olefin and oxygen-containing gas mixture is introduced into the solvent in a continuously stirred tank reactor, under the conditions of temperature and pressure described below. Suitable olefin:oxygen volumetric ratios are within the range of 1:5 to 15:1. Feed rates, generally, may vary from 0.5 to 1500 ft.$^3$/hr., or higher, and will largely depend upon reactor size. The oxygen input is adjusted in such manner as to prevent an excess of oxygen (>1%) in the off-gas or above the reaction mixture. Otherwise, a hazardous concentration of explosive gases is present. Also, if the oxygen of explosive gases is present. Also, if the oxygen (or air) feed rate is too high the olefin will be stripped from the mixture, thus reducing the concentration of olefin in the liquid phase and reducing the rate of oxidation of the olefin, hence giving lower conversions per unit time.

Intimate contact of the reactants, olefin and molecular oxygen, in the solvent is obtained by various means known to the art, e.g., by stirring, shaking, vibration, spraying, sparging or other vigorous agitation of the reaction mixture.

The olefin feed stocks contemplated herein include pure propylene, mixtures of propylene with other olefins, e.g., ethylene, or olefin stocks containing as much as 50% or more of saturated compounds, e.g., propane. Olefinic feed materials include those formed by cracking hydrocarbon oils, paraffin wax or other petroleum fractions such as lubricating oil stocks, gas oils, kerosenes, naphthas and the like.

The reaction temperatures and pressures are subject only to those limits outside which substantial decomposition, polymerization and excessive side reactions occur in liquid phase oxidations of propylene with molecular oxygen. Generally, temperatures of the order of 160° C. to 250° C. are contemplated. Temperature levels sufficiently high to prevent substantial build-up of any hazardous peroxides which form are important from considerations of safe operation. Preferred temperatures are within the range of from 180° C. to 230° C. Still more preferred operating temperatures are within the range of from 190° C. to 210° C. Suitable pressures herein are within the range of from 0.5 to 350 atmospheres, i.e., subatmospheric, atmospheric or superatmospheric pressures. However, the oxidation reaction is facilitated by use of higher temperatures and pressures, hence, the preferred pressure range is from 5 to 200 atmospheres. Still more preferred pressures are within the range of from 25 to 75 atmospheres. Pressures and temperatures selected will, of course, be such as to maintain a liquid phase.

The oxidation of olefins, e.g., propylene, in the present process is auto-catalytic, proceeding very rapidly after a brief induction period. A typical oxidation of propylene requires from about 0.1 to 20 minutes.

The reaction vessel may consist of a wide variety of materials. For example, aluminum, silver, nickel, almost any kind of ceramic material, porcelain, glass, silica and various stainless steels, e.g., Hastelloy C, are suitable. It should be noted that in the instant process where no added catalysts are necessary, no reliance is made upon the walls of the reactor to furnish catalytic activity. Hence, no regard is given to reactor geometry to furnish large-surface catalytic activity.

The oxidation products are removed from the reactor, preferably, as a combined liquid and gaseous mixture, or the liquid reaction mixture containing the oxidation products is removed to a products separation system, a feature of which, in part, comprises a two-flasher let-down arrangement. This arrangement in combination with the preceding propylene oxidation reaction and with succeeding product-separation steps constitutes a unique, safe, simple, economic and practical process for the commercial production and recovery of acetic acid.

In regard to the two-flasher let-down system, the principal advantages accruing from its use are that the two-flasher system (1) utilizes the heat of the oxidation reaction in the initial separation of gaseous and liquid products; this eliminates the need of cooling the reactor effluent; (2) minimizes the amount of total overhead solvent, resulting in a reduced solvent load on subsequent distillation columns. The advantages of this reduced solvent load are that smaller columns are required for the requisite products separations; (3) reduces the quantity of acidic components in solvent recycle streams and (4) removes the bulk of the fixed gases and very volatile components, thus reducing the pressure requirements to prevent excessive loss of product in subsequent processing steps. The total effect of these advantages is to provide an efficient, rapid, economical method for stabilizing acetic acid reaction mixtures while unloading solvent from the oxidation products and recycling solvent to the reactor. A single flasher or distillation column cannot perform all these functions, while a plurality of distillation columns or stripping columns requires long hold times, during which valuable by-products are subject to decomposition, hydrolysis, polymerization or other side reactions.

Although more than two flashers can be used, it is not economical to employ more than two.

A preferred specific embodiment of the present invention will be described in connection with the direct oxidation of propylene to acetic acid in a continuous operation, and a specific novel method of separating and refining this valuable product from other oxygenated products formed in the reaction, reference being made to the accompanying drawing. Suitable variations in the products separation train are also disclosed.

*Example*

In this process a one-liter Magnedrive autoclave serves as the reactor portion of a continuous system. Solvent, propylene and oxygen are introduced through a bottom port directly below a Dispersimax turbine agitator operating at 900 r.p.m. The reactor is heated electrically and temperature control is maintained by modulating water flow through internal cooling coils. Reaction temperatures are continuously recorded on a strip-chart.

In operation the reactants, 92% propylene and 95% oxygen, together with propylene glycol diacetate, a preferred solvent, are pre-mixed and fed through line 10 to the base of a reactor 11, operating at 850 p.s.i.g. and 200° C. The molar feed ratio of $C_3H_6/O_2$ is about 1.0. Total hold time is about 4 minutes. A variation is to provide two or more reactors in parallel operating under identical conditions and feeding the effluent from these reactors into the flash system described below.

The reaction product, a combined gas-liquid effluent, is fed continuously through line 12 to the first flasher 13 of a two-stage flasher let-down system. This flasher operates at 150 p.s.i.a. pressure and 200° C. From this flasher most of the low boiling components including all unreacted propylene, propane, $CO_2$ and at least one-half, and in this example approximately 60%, of the oxygenated low boilers goes overhead along with about one-third of the acids, e.g., formic and acetic acids, all dissolved gases and about 6–8% of solvent. Bottoms from this first flasher are fed through line 17 to a second flasher 18 operating at 30 p.s.i.a. and 200° C. Most of the residual low boilers, i.e., between 30% and 50% of that formed, about one-half of the remaining acids and 10–15% of the solvent are vaporized and taken overhead. Bottoms from the second flasher containing the bulk of the solvent, about 6% of the low boilers and about 30% of the acids, are fed through line 19 to an absorber 20.

A side stream of the solvent effluent from the second flasher is fed through line 21 to a residue removal column 22 where residue, i.e., polymeric reaction products having boiling points above that of the solvent, is removed as bottoms and the solvent is removed overhead through line 23 and returned to the reactor via the solvent recycle stream 44 from the absorber bottoms. The residue removal column is heated to 190° C. at the top and 216° C. at the bottom at a pressure of 15 p.s.i.a. Sixteen plates and a reflux ratio of 0.75 are used in this column.

Overhead from the flashers are directed to condensers operating with cooling water. The first flasher condenser 15 is a partial condenser wherein uncondensable, including fixed gases, most of the $CO_2$, about 6% of the total oxygenated low boilers and small amounts of propylene, i.e., about one-half of the unreacted propylene, and propane are separated from the condensables and fed through line 16 countercurrently to the solvent bottoms 19 from the second flasher 18 to the absorber. The absorber operates at 120 p.s.i.a. and approximately 70° C. at the top and 100° C. at the bottom and has twelve plates.

Fixed gases, $O_2$, $H_2$, $N_2$, $CH_4$, CO and $CO_2$ are vented from the top of the absorber. Propane, propylene, and other soluble low boiling components are absorbed in the solvent which is recycled to the reactor through line 44 or alternatively, further processed for propylene purification, as will be discussed below.

The second flasher condenser 14 serves as a total condenser and the condensed liquids from this condenser are combined with those from the first flasher condenser and this combined stream 25 containing 85–95% of the low boiling components, about two-thirds of the acids and from 15–20% of the solvent is fed to a primary products splitter 26, a distillation column containing 40 plates and operating at about 40° C. at the top and 210° C. at the bottom under 150 p.i.s.a. pressure and a reflux ratio of 0.16. In this column lower boiling components including unreacted propylene, propane, acetaldehyde, propylene oxide, methyl formate, and a small amount of residual $CO_2$ are removed overhead and water, acids, methanol, acetone, methyl acetate and residual solvent are removed as bottoms. The processing of this bottoms stream to recover acetic acid will be discussed below.

The overhead stream 27 from the primary products splitter column is fed to a propylene-propane removal column 28. This column is heated to about 50° C. at the top and 160° C. at the bottom and maintained at 300 p.s.i.a. and propylene, propane and any residual $CO_2$ are removed overhead while low boiling oxidation products such as propylene oxide, acetaldehyde and methyl formate are removed as bottoms through line 31. Thirty-four plates and a reflux ratio of 0.31 are used. The overhead from this column is fed through line 29 to a propane-propylene splitter column 30. This column is heated to approximately 50° C. at the top and 55° C. at the bottom under 300 p.s.i.a Seventy-five plates and a reflux ratio of 11.7 are utilized. Propane is removed from the bottom through line 34 and propylene is taken overhead through line 35 and recycled to the reactor. Some propane may be driven overhead, if desired, for recycle by increasing the temperature at the bottom of this column.

An alternative procedure for removing propane from recycle propylene is to combine the overhead from the propylene-propane removal column with the overhead stream from the first flasher condenser leading to the absorber. As mentioned previously, the liquid bottoms from the absorber containing solvent, propylene and propane may be recycled directly to the reactor or further processed for propylene purification, i.e., propane removal. When the concentration of propane in the reactor tends to build up to a level which interferes with the propylene oxidation, additional, or excess, propane is prevented from being recycled to the reactor by directing the effluent bottoms from the absorber, wholly or partially, through a side-stream taken from the absorber bottoms stream, by means of a distributing valve into a desorber operated at about 50° C. at the top and 100° C. at the bottom and 300 p.s.i.a. pressure. Here, solvent is removed as bottoms and recycled to the reactor and propane and propylene are removed overhead to a $C_3H_6$—$C_3H_8$ splitter operating at 300 p.s.i.a. and heated to about 50° C. at the top and 55° C. at the bottom. Propane is removed as bottoms and propylene of essentially the same composition as the initial feed material is recycled to the reactor propylene feed stream.

Turning now to the recovery of the acetic acid product and other valuable oxygenated by-products, reference is made to the bottoms stream 50 from the primary products splitter 26 described above. This stream contains all of the solvent taken overhead from the two-flasher let-down system, acid values, water, low boiling components not removed in the primary products splitter overhead stream, including methanol, methyl acetate, acetone, isopropanol, allyl alcohol, biacetyl and others, various high boiling components including acetonyl acetate, and a small amount of residue. This stream is fed to a solvent-acids splitter 51.

From the solvent-acids splitter, which has 10 plates and operates at about 105° C. at the top and 192° C. at the bottom under 15 p.s.i.a. pressure and using a reflux ratio of 3.0, most of the residual solvent and high boiling components are removed as bottoms through line 52 and recycled to the reactor via the absorber. The overhead product from the solvent-acids splitter containing the remaining residual solvent, acid values, water and low boiling components is passed through line 53 to an acids-low boilers separation distillation column 54 where the low boiling components and a small amount of water are recovered overhead through line 55. This column utilizes 60 plates and operates at about 88° C. at the top and 116° C. at the bottom under 15 p.s.i.a. pressure and a reflux ratio of 8.0.

Bottoms from the acids-low boilers separation column containing primarily acetic acid, formic acid, water and a small amount of residual solvent are directed through line 56 to an azeotropic distillation column 57 wherein acetic acid is separated from formic acid and water. It has been found that this very difficult separation can be accomplished readily and effectively by use of benzene as the azeotropic distillation solvent. Although acetic acid may suitably be separated from formic acid and water by other azeotropic distillation solvents, e.g., trichloroethylene or ethylene dichloride, the use of benzene, as in the instant process, offers a number of decided advantages. For example, halogenated compounds are susceptible to hydrolysis to halides, e.g., hydrogen chloride, particularly in the presence of organic acids, thus presenting corrosion problems, sooner or later. The presence of such corrosive halides necessitates the use of equipment made of expensive alloys or halide removal systems. Also, benzene is less expensive. In addition, benzene is less soluble in the aqueous phase, thus obviating any need for an additional separation system to recover the solvent reuse.

In the present embodiment, benzene is fed through line 61 to an azeotropic distillation column at a point above the top tray at a ratio of 9 parts by weight of benzene for each part of overhead product from the column. This column contains 70 trays and operates at about 77° C. at the top and 125° C. at the bottom under 15 p.s.i.a. pressure. Uniquely, in this system benzene forms two distinct azeotropic mixtures; one with water and one with formic acid, rather than a ternary azeotrope of these three components. In operation, a benzene-water azeotrope and a benzene-formic acid azeotrope are removed overhead through line 58 to a condenser 66 (circulating water). Upon condensing, a mixture of benzene, water and formic acid are passed through line 67 to a collector 59 wherein the mixture separates into an upper benzene phase and a lower phase containing about 42% water, 55% formic acid and about 3% acetic acid. The latter components are removed from the bottom of the collector while benzene from the upper phase (replenished with make-up benzene through line 60) is recycled through line 61 to the azeotropic distillation column.

Meanwhile, acetic acid is removed as the bulk of the bottoms (over 86 weight percent) from this column through line 62 together with small amounts of residual solvent from the main oxidation reactor to an acetic acid refining column 63 having 40 trays and operating at about 118° C. at the top and 130° C. at the bottom under 15 p.s.i.a. pressure and a reflux ratio of 50. Purified acetic acid is recovered overhead through line 65 while the residual oxidation solvent is removed as a bottoms stream 64. This stream is combined with the bottoms 52 from the solvent-acids splitter 51 and from flasher 18 and fed to the absorber 20 and then recycled to the oxidation reactor by way of the absorber bottoms 44. This absorber bottoms stream contains about 40% by weight of residue upon entering the reactor. Under the conditions of operation in this embodiment the amount of residue purged from the recycle solvent is controlled to maintain a relatively constant residue level in the reactor.

In a typical oxidation according to the present embodiment feed materials are added to the main oxidation reactor at approximately the following hourly rates: propylene, 575 g., oxygen, 600 g. and solvent (e.g., propylene glycol diacetate), 4,600 g. At steady state (reactor residence time about 10.0 minutes) propylene conversion is about 45% and oxygen conversion 99.95%. Acetic acid is obtained in about 36 mole percent yield based on propylene reacted, together with minor amounts of other oxygenated products.

Solvent losses due to mechanical operation of the process are made up by adding fresh solvent to the system as needed, preferably, to the solvent recycle line entering the absorber.

While the invention has been specifically described with reference to the oxidation of propylene and recovery of acetic acid and other valuable oxygenated products, it is within the purview of the invention to utilize the above-described and illustrated system for the oxidation of other olefinic compounds to carboxylic acids and recovery thereof, together with associated oxygenated products similarly as described above. It being understood that process conditions, e.g., temperatures and pressures in the reactor, flasher, stripper, columns, etc. will be modified accordingly to make the necessary separations.

Other olefins suitable for use herein preferably include those of the ethylenic and cycloethylenic series up to 8 carbon atoms per molecule, e.g., ethylene, propylene, butenes, pentenes, hexenes, heptenes and octenes; cyclobutenes, cyclopentenes, cyclohexenes, cyclooctenes, etc. Of particular interest, utility and convenience are acyclic olefins containing from 2 to 8 carbon atoms. Included are the alkyl-substituted olefins such as 2-methyl-1-butene, 2-methyl-2-butene, 2-methyl-propene, 4-methyl-2-pentene, 2,3-dimethyl-2-butene and 2-methyl-2-pentene. Other suitable olefinic compounds include dienes such as butadiene, isoprene, other pentadienes and hexadienes; cyclopentenes, cyclohexenes, cyclopentadienes, vinyl-substituted cycloalkenes and benzenes, styrene, methylstyrene, and other vinyl-susbtituted aromatic systems.

It is to be understood that the foregoing detailed description is merely illustrative of the invention and that many variations will occur to those skilled in the art without departing from the spirit and scope of this invention.

We claim:

1. Process for the production of acetic acid which comprises oxidizing propylene feedstocks with molecular oxygen in a solvent selected from the group consisting of fully esterified polyacyl esters of polyhydroxyalkenes, polyhydroxycycloalkanes, polyglycols and mixtures thereof, wherein said esters contain from 1 to 18 carbon atoms in each acyl moiety and from 2 to 18 carbon atoms in each alkylene and cycloalkylene moiety, under temperatures and pressures sufficient to cause the reaction to proceed in the liquid phase and recovering said acetic acid by:

(a) directing an effluent stream of the reaction mixture from a reaction zone through a plurality of successive flashing zones, said flashing zones being maintained at pressures substantially lower than in each preceding zone and at temperatures necessary to separate most of the acetic acid and lower boiling products overhead as gas phase and higher boiling components including the bulk of the solvent and residue which are removed as bottoms from said flashing zones, (b) passing said overhead gas phase to condensing zones, from whence uncondensed gases are directed to an absorbing zone into which the bottoms stream from said flashing zones is also passed to absorb uncondensed propylene, propane and minor amounts of oxygenated components; removing vent gases overhead from said absorber, while feeding the bottoms stream from said absorbing zone back to said reaction zone as recycle solvent, (c) directing a side stream of said bottoms from said flashing zones through a residue removal zone wherein residues of polymeric reaction products having boiling points above that of said solvent are removed as bottoms and solvent is distilled overhead and combined with the solvent bottoms from said absorbing zone and recycled to said reaction zone, (d) feeding a combined stream of condensed liquids from said condensing zones into a primary products splitting distillation zone from which an overhead stream containing unreacted propylene, propane and some low boilers is removed to a propylene-propane removal zone from which said low boilers are removed as bottoms while propylene and propane are removed overhead and fed to a distillation splitter for these components and wherein propane is removed as bottoms and propylene is removed overhead and recycled to said reaction zone, (e) feeding the bottoms from said primary products distillation splitting zone in step (d) to an acid-solvent distillation splitting zone where most of the residual solvent from said reaction zone not removed in said flashing zones and higher boiling components are removed as bottoms and recycled to said absorber, (f) feeding the overhead from said acid-solvent distillation splitting zone containing residual solvent, acid values, water and low boilers to an acids-low boilers distillation zone wherein the low boilers and some water are recovered overhead, while directing the bottoms from said acids-low boilers separation zone to an azeotropic distillation column using benzene as an azeotropic-former for water and formic acid, (g) removing from said azeotropic distillation zone an overhead stream containing a mixture of benzene-water and benzene-formic acid azeotropes to a condensing zone wherein benzene is separated from water and formic acid and feeding these three components to a collecting zone in which benzene forms an upper phase from which benzene is returned to said azeotropic distillation zone, while water and formic acid are removed as bottoms, and (h) removing from said azeotropic distillation zone a bottoms stream containing primarily acetic acid and a small amount of residual solvent to a refining zone wherein purified acetic acid is recovered overhead and said residual solvent is removed as bottoms and recycled to said absorber.

2. Process according to claim 1 wherein said solvent comprises a vicinal diacyl ester of a polyhydroxyalkane.

3. Process according to claim 2 wherein said solvent comprises propylene glycol diacetate.

4. Process according to claim 1 wherein said oxidation occurs at temperatures within the range of from 160° C. to 250° C. and pressures within the range of from 0.5 atmosphere to 350 atmospheres.

5. Process according to claim 4 wherein said oxidation occurs in the absence of added catalysts.

References Cited

UNITED STATES PATENTS

| | | | |
|---|---|---|---|
| 1,813,636 | 7/1931 | Petersen et al. | 203—69 |
| 2,224,984 | 12/1940 | Potts et al. | 203—88 |
| 2,658,863 | 11/1953 | Guala | 203—88 |
| 2,744,939 | 5/1956 | Kennel | 203—88 |
| 2,985,668 | 5/1961 | Shingu | 260—533 |
| 3,024,170 | 3/1962 | Othmer et al. | 203—67 |
| 3,153,058 | 10/1964 | Sharp et al. | |

NORMAN YUDKOFF, *Primary Examiner.*

WILBUR L. BASCOMB, JR., *Examiner.*